May 21, 1968            L. JÄGERS            3,383,968

SAW FOR CUTTING COLD METAL

Filed March 17, 1966            4 Sheets-Sheet 1

Inventor:
Leopold Jägers
by Michael J. Striker
Atty

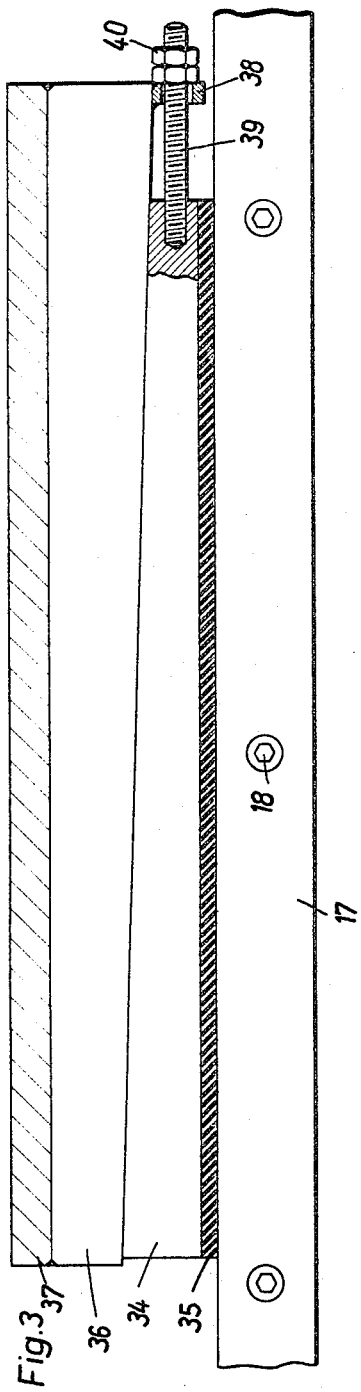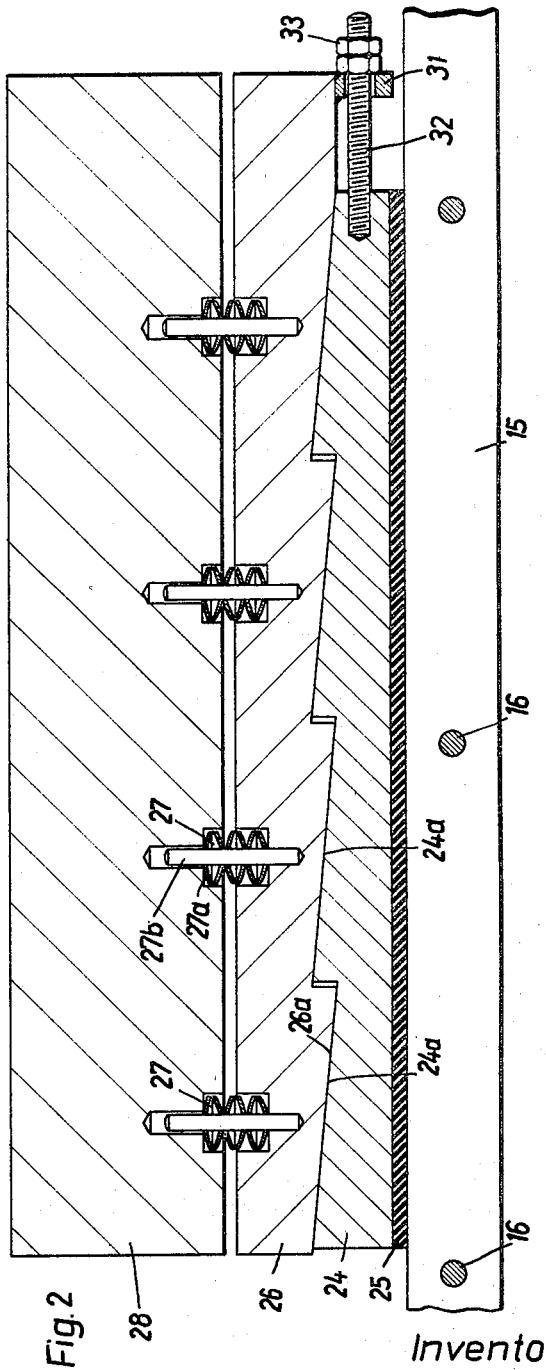

May 21, 1968  L. JÄGERS  3,383,968
SAW FOR CUTTING COLD METAL
Filed March 17, 1966  4 Sheets-Sheet 3

Inventor:
Leopold Jaegers
by Michael J. Striker
Atty.

May 21, 1968 L. JÄGERS 3,383,968
SAW FOR CUTTING COLD METAL
Filed March 17, 1966 4 Sheets-Sheet 4

Inventor:
Leopold Jaegers
by Michael J. Striker
Atty.

3,383,968
SAW FOR CUTTING COLD METAL
Leopold Jägers, Munstereifeler Str. 115,
Euskirchen, Germany
Filed Mar. 17, 1966, Ser. No. 535,179
Claims priority, application Germany, Mar. 18, 1965,
T 28,201
12 Claims. (Cl. 83—582)

ABSTRACT OF THE DISCLOSURE

A gear box carries a circular saw blade and is movable in a predetermined path. A support includes two side walls at opposite sides of the gear box and extending parallel to the path of movement, and a top wall above the gear box. Interengaging guideways are provided on the gear box and the underside of the top wall for guiding the gear box in its path. Similarly cooperating guide arrangements are provided on the gear box and the side walls, and one such guide arrangement urges the gear box upwardly towards the top wall to effect close engagement of the aforementioned guideways.

---

Figure 1:
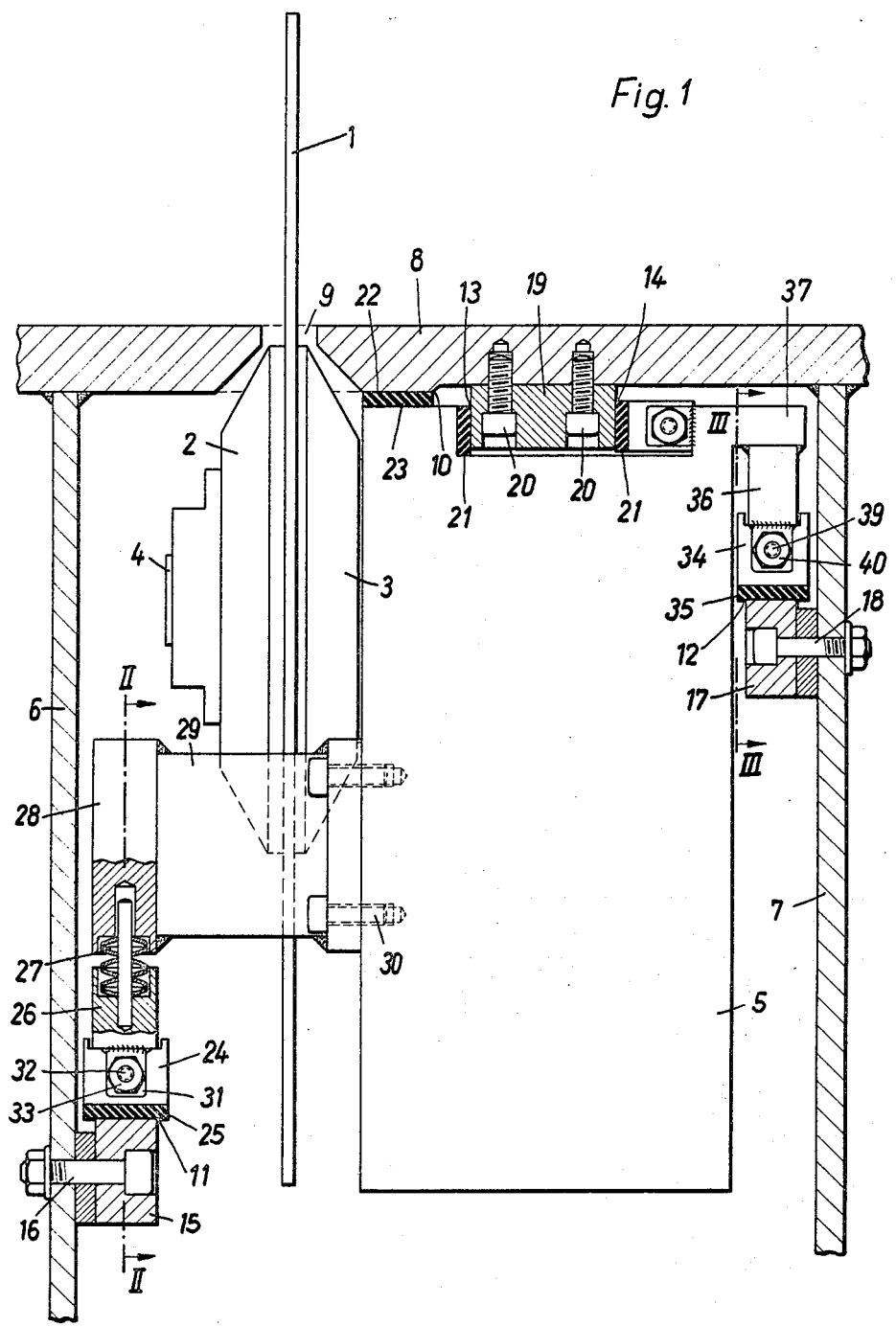

In my U.S. patent application Ser. No. 432,094, now U.S. Patent No. 3,315,554, I have disclosed a saw for cutting cold metal including a circular saw blade which together with a gear box housing the circular saw is slidable in the sawing direction. The gear box is provided with a guideway which rests against a guideway of a plate supporting the workpiece, and with another guiding means resting against a rail parallel to and connected to the supporting plate, such that springs press said first guideway against said second guideway of the supporting plate. Said guiding means may be rollers which roll on the rail and which are supported by an element connected to the gear box via the springs which press said first guideway against said guideway of the supporting plate.

This invention has for its object to make guiding of the gear box still more accurate.

According to the invention a second parallel rail is connected with the supporting plate in addition to the first-mentioned rail, and both rails are mounted at opposite sides of a plane normal to the guideway. Each rail has a guide which is connected to the gear box, and at least one of these guides is connected with the gear box by means of a compression spring, such that the whole guideway of the gear box is pressed against the guideway of the supporting plate. Preferably the guide which is located at the side of the guideway adjacent the sawing blade is connected to the gear box by compression springs, whereas the other guide is rigidly connected to the gear box.

One or the other of the guides, or both of the guides, can be in form of a sliding shoe sliding on the associated rail, and the side of the shoe which is opposite to the sliding surface thereof can be slightly inclined relatively to this sliding surface and abut against an intermediate member relative to which it can be adjusted in the longitudinal direction.

The guide presses the guideway of the gear box against the said guides of the supporting plate, whereas the guide of the other rail constitutes a fixed pivot point about which the gear box is pivoted by the spring, this pivoting movement being of course very small.

Preferably the guideway of the gear box abuts the supporting plate closely adjacent to the saw blade, whereas the sliding shoe together with the intermediate member is connected to the gear box by means of compression springs. To prevent a deformation of the saw blade during sawing a jaw can be connected to the gear box which frictionally contacts the saw blade, and the jaw can have means for adjusting its distance from the gear box. In a similar way it is possible to adjust the distance of another jaw, which is in frictional contact with the saw blade between the guideway and the saw blade.

For connecting the jaws to the gear box or to the guideway, respectively, a member can be provided which is elastic in the direction of the saw blade shaft and which is inelastic in direction of the feed of the saw blade.

Figure 4:
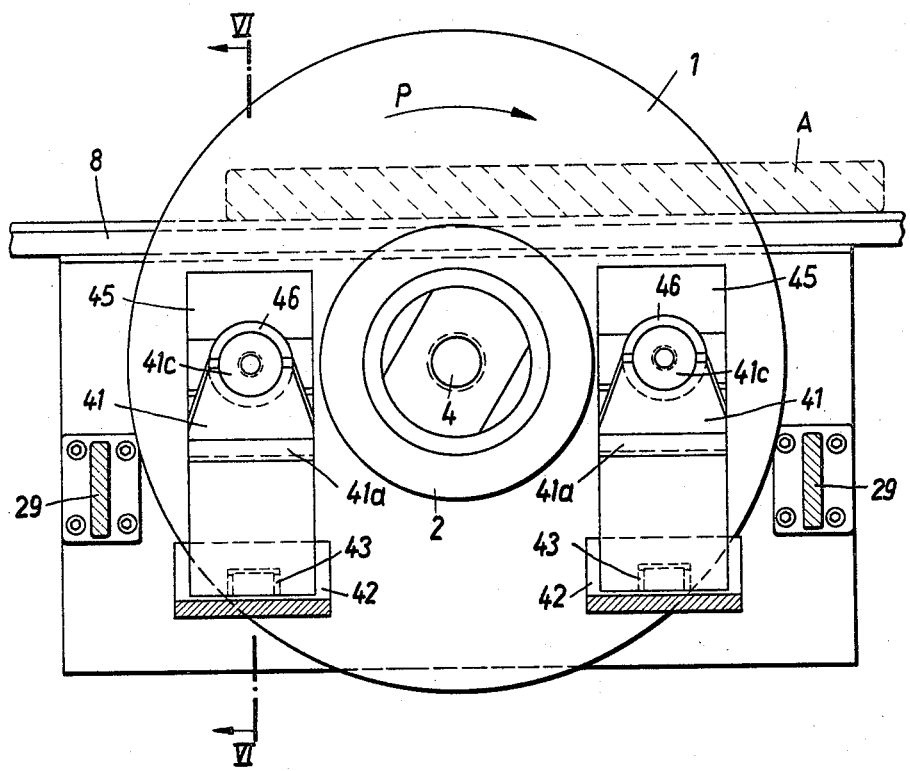
Figure 5:
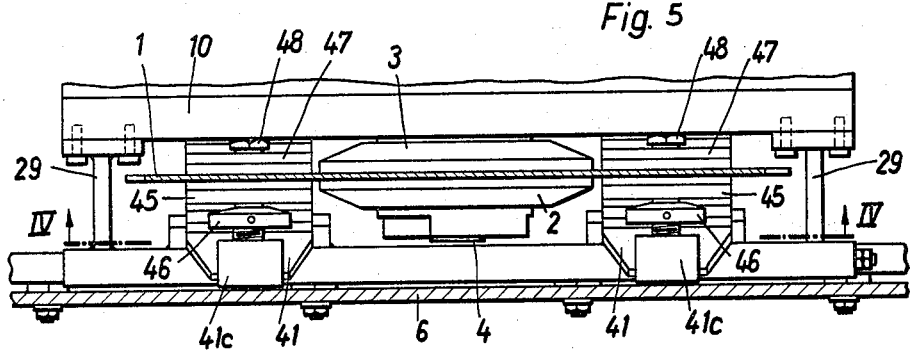
Figure 6:
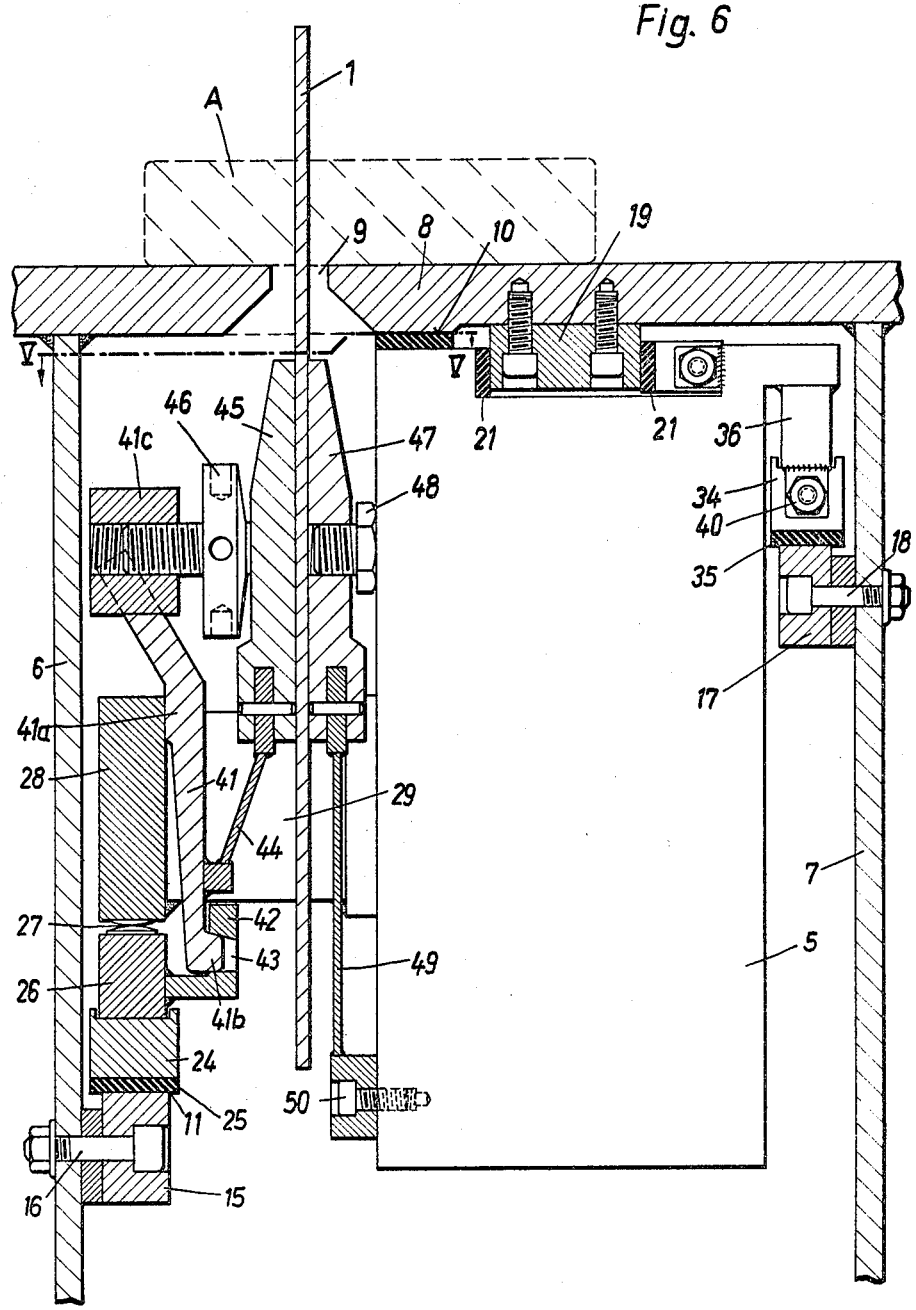

The invention is illustrated in the accompanying drawings in which:

FIG. 1 is a vertical section of the gear box of a saw for cutting cold metal according to the present invention, FIG. 2 is a section according to the line II—II of FIG. 1, FIG. 3 is a section according to the line III—III of FIG. 1, FIG. 4 is a partly sectioned detail view of FIG. 1, but on a reduced scale, FIG. 5 is a section according to line V—V of FIG. 6, FIG. 6 is a section according to line VI—VI of FIG. 4.

The circular saw blade 1 is connected to a shaft 4 by means of damping jaws 2, 3 which are supported by a gear box 5 containing the driving gear for the shaft 4. The driving motor is not shown and may be arranged within or be connected to the gear box 5. FIG. 1 shows only the vertical walls 6 and 7 of the machine frame and the supporting plate 8 carried by said machine frame. The supporting frame 8 has a slot 9 in which the cutting saw blade rotates. The gear box 5 together with the saw can be moved in the direction of sawing, that is in a direction perpendicular to the plane of FIG. 1. The moving means, which are not shown in the drawing, may comprise a motor-driven screw jack with a nut connected to the gear box. The gear box is guided by three horizontal guideways 10, 11, 12 and by two vertical guideways 13, 14. The guideway 10 is arranged directly below the supporting plate 8 whereas the guideways 11 and 12 are in form of rails 15, 17 which are connected by screws 16, 18 to the frame walls 6, 7. A further guide rail 19 is located below the supporting plate 8 to which it is connected by the screws 20, and it constitutes a horizontal guide.

A shoe 24 is guided by the rail 15 on which it rests with a guide 25 (see also FIG. 2). The shoe 24 is provided on the side opposite the guide 25 with stepped inclined surfaces 24a which abut against correspondingly stepped inclined surfaces 26a of an intermediary member 26. This intermediary member is connected by four compression springs 27 to an end portion 28 of an arm 29 which in turn is connected via screws 30 to the gear box 5.

The springs 27 are each constituted by a plurality of dished springs 27a which are connected by a pin 27b. The intermediate member 26 has at its one end a lug 31 which receives a screw 32 which is threaded into the shoe 24. By means provided on nuts 33 of the screw 32 the shoe 24 can be moved relatively to the intermediate member 26 and thus the combined thickness of the parts 24, 26 can be altered.

The rail 17 carries a shoe 34 which slides thereon with a leading ledge 35. The side of the shoe 34 which is opposite the leading ledge 35 is inclined in the direction of movement and abuts against an oppositely inclined face of an intermediate member 36 (see FIG. 3), which is connected to an arm 37 of the gear box 5. The intermediate member 36 has at one end a lug 38 against which nuts 40 of a screw 39 abut, said screw 39 being threaded into the end of the shoe 34. By means of the nuts 40 the shoe 34 can be moved relatively to the intermediate member 36, so that the combined thickness of the parts 34, 36 can be altered.

The leading ledges can be made of bronze or of a plastic enriched with graphite.

By means of the screws and nuts 32, 33, or 39, 40, respectively, the combined thickness of the parts 24, 26 or 34, 36, respectively, is adjustable such that the leading ledge 23 abuts tightly and precisely perpendicular to the plane of the saw blade 1 against the surface 22 of the supporting plate 8. The position of the saw blade during the entire movement thereof is thus defined by the guideway 10, and the result is an extremely uniform cut. The saw according to the invention can cut chips with a thickness of several cm. and with a length up to 1 m., and more.

FIGS. 4-6 show the jaws 45 and 47, between which the saw blade 1 is guided at opposite lateral sides of its shaft 4 in order to avoid any bending or fluttering.

Each of the jaws is carried by a steel sheet 49, on end of which is connected by a screw 50 to the gear box 5.

As the plane of the steel sheet 49 extends in the direction of advancement of the saw blade 1, the jaws 47 are so supported that they cannot move relatively to the saw blade 1 in this direction. Therefore, during the advancement of the saw blade 1 the jaws 47 move together with the saw blade 1 and with the gear box in the direction of advancement.

Because the steel sheet 49 is elastic the jaws 47 can be moved and adjusted in the direction of the shaft 4 of the saw blade 1 by means of screws 48 which are inserted into the respective jaws 47 and whose heads abut against the gear box 5.

Each jaw 47 is located opposite to a jaw 45, so that the blade 1 is clamped between pairs of opposed jaws 47 and 45. Each jaw 45 is carried by a steel sheet 44 one end of which is welded to a holding member 41. The holding member 41 fits with its end 41b in a corresponding recess 43 of a shoulder 42 welded to the intermediate member 26. The upper end of the holding member 41 is formed as a nut 41c for a screw 46, the head of which abut against the jaw 45. The central part of the holding member 41 has a supporting face 41a abutting against the end piece 28 which is connected by the arm 29 to the gear box 5.

Therefore, during the advancement of the saw blade 1, the jaw 45 as well as the jaw 47 is moved in the direction of advancement.

By means of the screws 46 and 48 the jaws 45 and 47 can be moved transversely to the plane of the saw blade 1 so that the pressure of the jaws 45 and 47 against the blade 1 can be adjusted. Moreover, by adjustment of the screws 46, 48 and of the nuts 33, 40 of the screws 32 and 39, the saw blade can be accurately positioned in a plane vertical to the surface of the supporting plate 8.

I claim:

1. A circular saw, particularly for cutting cold metal, comprising a circular saw blade adapted to be rotated about an axis; drive means operative for rotating said saw blade and including a housing carrying the same, said drive means and saw blade being movable in a predetermined cutting path transversely of said axis; support means, including top wall having an underside and an upper side adapted to support a workpiece thereon, and two transversely spaced side walls extending downwardly from said top wall at opposite sides of said housing and of said cutting path; guide means for guiding said housing for movement in said cutting path and including interengaging guideways on said housing and said underside of said top wall and extending intermediate said side walls in parallelism with the latter and with said cutting path, and a pair of guide arrangements each including a guide rail provided on one of said side walls and extending in parallelism with said cutting path and a guide portion connecting said housing with the respective guide rail; and biasing means associated with at least one of said guide arrangements and being operative for biasing said housing towards said top wall and for thereby effecting close engagement of said guideways with one another.

2. A circular saw as defined in claim 1, wherein said biasing means comprises compression spring means connecting said guide portion of said one guide arrangement with said housing.

3. A circular saw as defined in claim 1, wherein one of said guide arrangements is located at a level above and closer to said top wall than the other guide arrangement, and wherein said biasing means is associated with said one guide arrangement.

4. A circular saw as defined in claim 1, wherein said guide arrangements are located at opposite sides of a plane normal to said guideways and paralleling said cutting path, said one guide arrangement being closer to said plane than the other of said guide arrangements.

5. A circular saw as defined in claim 4, wherein said guide portion of the other of said guide arrangements is rigid with said housing.

6. A circular saw as defined in claim 4, wherein said guideways are located closely adjacent to one side of said saw blade parallel to the general plane thereof, and wherein said one guide arrangement is located at the side of said saw blade which is opposite said one side.

7. A circular saw as defined in claim 1, wherein said guide portions each comprise a glide shoe member having one surface in engagement with the respective rail and elongated in direction of the same, and another surface facing away from the respective rail, said other surface being slightly inclined with reference to said one surface in longitudinal direction thereof; said guide portions each further comprising an intermediate member having a face abutting said other surface, one of said members being shiftable with reference to the other in longitudinal direction of said surfaces.

8. A circular saw as defined in claim 7, wherein said biasing means comprises compression spring means connecting said members of said guide portion of said one guide arrangement with said housing.

9. A circular saw as defined in claim 1; further comprising at least one jaw carried by said guide portion of said one guide arrangement and located at one side of said saw blade, and at least one other jaw carried by said housing and located at the opposite side of said saw blade; and means for adjustably moving the respective jaws into sliding engagement with said saw blade from opposite sides thereof for preventing deflection of said saw blade.

10. A circular saw as defined in claim 9, wherein said means comprise spring means respectively connecting said jaws to said guide portion of said one guide arrangement and to said housing, said springs being rigid in the direction of said cutting path and being elastic in direction transversely of said cutting path.

11. A circular saw as defined in claim 9, wherein at least said one jaw is releasably carried by said guide portion of said one guide arrangement, so as to be readily removable from the same.

12. A circular saw as defined in claim 10, wherein said means comprise elements connecting said jaws to said guide portion of said one guide arrangement and to said housing, respectively, said elements being elastic in direction transversely of said cutting path of said saw blade and being inelastic in the direction of said cutting path.

References Cited

UNITED STATES PATENTS

| | | | |
|---|---|---|---|
| 2,719,761 | 10/1955 | Bonnafe | 143—47 |
| 2,870,802 | 1/1959 | Richards | 143—47 |
| 2,933,111 | 4/1960 | Fish | 143—47 X |
| 3,315,554 | 4/1967 | Jaegers | 83—588 |

FOREIGN PATENTS 187,773  11/1956  Austria.

WILLIAM S. LAWSON, *Primary Examiner.*